INVENTOR
LUDWIG A. SANDERS
By Emil Bönnelycke
ATTORNEY

Oct. 10, 1933.    L. A. SANDERS    1,929,566
AIRPLANE
Filed March 30, 1931    2 Sheets-Sheet 2

INVENTOR
LUDWIG A. SANDERS
By Emil Bönnelycke
ATTORNEY

Patented Oct. 10, 1933

1,929,566

UNITED STATES PATENT OFFICE 1,929,566

AIRPLANE

Ludwig Adrian Sanders, Voorburg, Netherlands, assignor to Johann Anton Sanders, Voorburg, Netherlands, and Frans Lambert Stoot, The Hague, Netherlands Application March 30, 1931, Serial No. 526,408, and in the Netherlands April 7, 1930

4 Claims. (Cl. 244—12)

The invention relates to an airplane in which the wing and the body gradually merge into each other and all sections, parallel to the main symmetry plane, are profiles having the same shape of profiles gradually decreasing towards the ends of the wing.

According to the invention the thickness of the wings is decreasing parabolically towards the end in such a way that the top of the parabola is located near the root of the wing. In other words, the top surface of the wing curves parabolically to correspond to a parabola, the directrix of which is horizontal and the vertex or top of which is located near the root of the wing.

Also according to the invention the sections of the wing may be so displaced mutually that their chords are no longer parallel to the chord of the main symmetry surface.

The most important advantage of the invention is this that in this way the most favourable configuration of the longitudinal girders as regards their structural height is obtained, and at the same time the wings in plan view will approach the most ideal shape, confined by parabolas, whereby the supporting effect of the wings is most favourable. Thereby an airplane constructed according to the invention has a larger radius of action than other airplanes, because the resistance is reduced to a minimum.

The construction is extremely simple, because the complete plan of the whole airplane is determined by the front view and a normal profile. The thickness of the wing therefore is starting detail. The shape of the wings in plan view will become such that the bounding lines of the same are also parabolas having their tops near the root of the wings.

Some embodiments of the invention are illustrated in the accompanying drawings.

Figure 3:
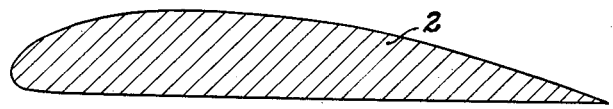
Fig. 3 is a sectional view taken through the wing of Fig. 2.

In all embodiments all sections, parallel to the main symmetry plane, such as shown in Fig. 3, are uniform profiles.

The thickness of the wings 2 is decreasing gradually towards the ends of the wings, according to a parabola, the top of which is located near the root of the wing. This appears from Fig. 1. In this embodiment the upper surfaces of the wings are shaped according to the said parabolas, the lower surfaces not. However, it is just as well possible to construct the lower surfaces according to such a parabola and the upper surfaces not, or to form both surfaces parabolically, but always according to a parabola the top of which is located near the root of the wing.

Figure 1:
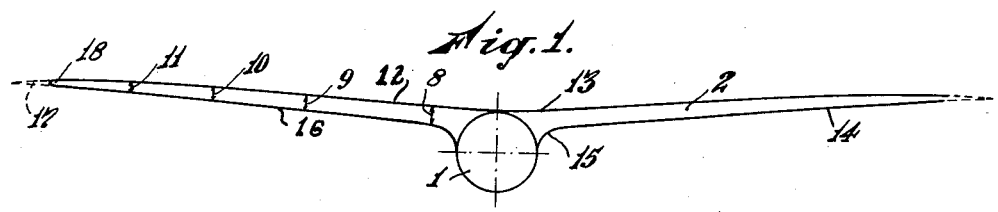
Fig. 1 is a front view and Fig. 2 a top view of one of the embodiments.

In Fig. 1 and lines 8, 9, 10 and 11 indicate the thickness of the wing at four places in the wing. These lines are erected vertically on the lower surface and of such a length that their tops are confined by the parabola 12, the top of which is located near the root of the wing. The same is seen at the other wing. The said parabola is indicated there by 14 and the top by 15.

Figure 2:
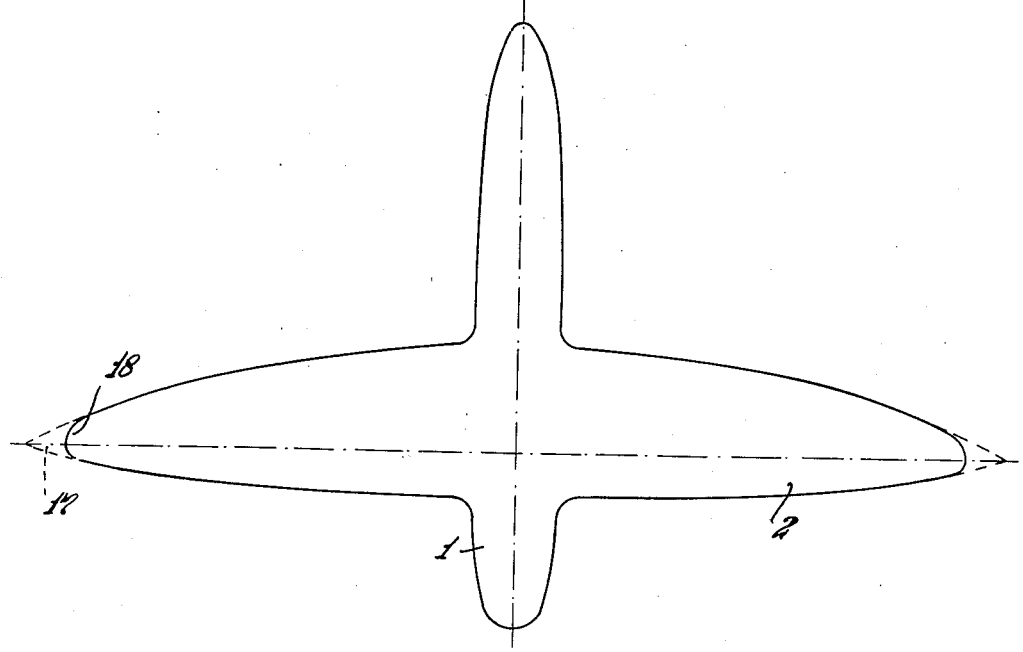

It appears from the above that if the front view has been determined, the whole shape of the airplane is determined by the same. The parabola 12 crosses the lower surface 16 in the point 17 by which the length of the wing is fixed. In practice the wings will not end in an acute point, but their ends are finished as indicated at 18 in Fig. 2.

According to the invention airplanes of various form may be constructed which are suitable to the special purposes for which they are intended. A few examples are given in the Figs. 4 and 5, and in the Figs. 6 and 7.

Figure 4:
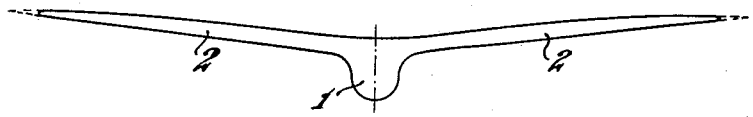
Fig. 4 is a front view and Fig. 5 a top view of a second embodiment.
Figure 5:
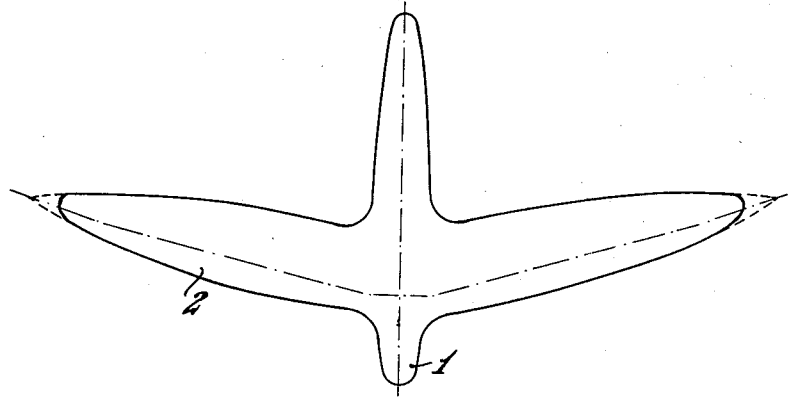
Figure 6:
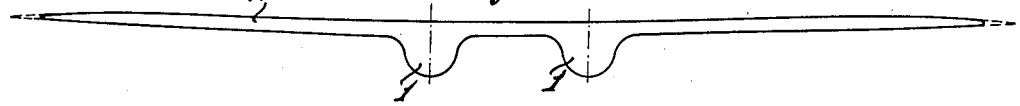
Fig. 6 is a front view and Fig. 7 a top view of a third embodiment.
Figure 7:
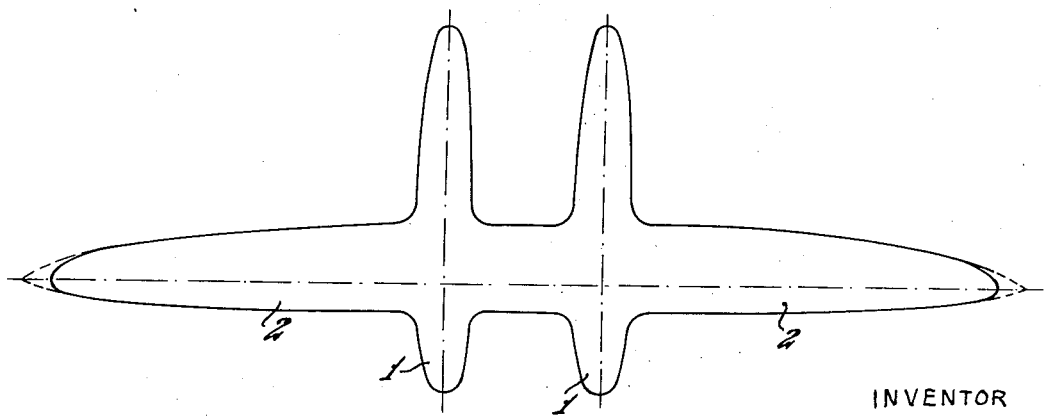

In the embodiment of the Figs. 4 and 5 the wings 2 deviate in backward direction, the embodiment of the Figs. 6 and 7 showing a double body 1 and being intended for a traffic-airplane. The embodiment of the Figs. 4 and 5 is suitable for pursuit-planes, e. g. for military purposes.

An airplane constructed according to the invention fully satisfies all aerodynamical requirements.

In view of the desired landing speed the sections of the supporting surfaces may be displaced gradually with regard to each other, so that the chords of the sections are no longer parallel to those of the main symmetry surface.

I claim:

1. An airplane comprising a body and wings, the thickness of the wings decreasing parabolically toward the ends, each wing being so conically structed that the difference in thickness of progressive adjacent sections plotted against the length of the wing defines a parabola, the vertex of which lies at the root of the wing and the directrix of which is substantially longitudinal.

2. An airplane comprising a body and wings, the wing surface and the body merging into each other, said wings being so formed that all sections parallel to the main symmetry surface are uniform profiles having the same shape and decreasing gradually toward the ends of the wings, the thickness of the wings decreasing parabolically toward the ends, said wings being so constructed that a curve drawn through the upper extremities of the projections on a vertical plane of lines representing the vertical thickness of progressive adjacent sections of the wings parallel to the lateral axis of the craft is a parabola having its vertex lying at the root of the wings and its directrix substantially horizontal.

3. An airplane, wherein the wing surface and the body merge into each other, and all sections parallel to the main symmetry surface are uniform profiles having the same shape and decreasing gradually toward the end of the wing, the thickness of the wing decreasing parabolically toward the end in such a way that the vertex of the parabola in projection on a vertical plane parallel to the lateral axis of the airplane is located near the root of the wing and the directrix of which is substantially horizontal.

4. The airplane set forth in claim 1, wherein the sections of the wing are displaced gradually relative to one another so that the chords of the sections are no longer parallel to the chord of the main symmetry surface thereof.

LUDWIG ADRIAN SANDERS.